United States Patent
Whatley

(10) Patent No.: US 8,359,915 B2
(45) Date of Patent: Jan. 29, 2013

(54) BRAKE TEST ARRANGEMENT

(75) Inventor: Mark Whatley, Gosport (GB)

(73) Assignee: Goodrich Actuation Systems Limited (GB)

( * ) Notice: Subject to any disclaimer, the term of this patent is extended or adjusted under 35 U.S.C. 154(b) by 113 days.

(21) Appl. No.: 13/039,615

(22) Filed: Mar. 3, 2011

(65) Prior Publication Data
US 2011/0219863 A1    Sep. 15, 2011

(30) Foreign Application Priority Data
Mar. 11, 2010 (GB) .................................... 1004030.1

(51) Int. Cl.
*G01L 5/28* (2006.01)
(52) U.S. Cl. ........................................................ 73/121
(58) Field of Classification Search ............... 73/121, 73/123, 126, 130
See application file for complete search history.

(56) References Cited

U.S. PATENT DOCUMENTS

| | | | |
|---|---|---|---|
| 3,146,619 A * | 9/1964 | Sinclair et al. | 73/121 |
| 5,097,933 A | 3/1992 | Davies | |
| 5,167,148 A * | 12/1992 | Black et al. | 73/121 |
| 5,689,058 A * | 11/1997 | Yuan | 73/9 |
| 7,398,669 B2 * | 7/2008 | Mahajan et al. | 73/10 |
| 7,784,335 B2 * | 8/2010 | Fukamachi et al. | 73/121 |
| 2007/0068220 A1 * | 3/2007 | Mahajan et al. | 73/9 |

\* cited by examiner

*Primary Examiner* — Freddie Kirkland, III
(74) *Attorney, Agent, or Firm* — Andrus, Sceales, Starke & Sawall, LLP

(57) ABSTRACT

A brake test method is disclosed for use in testing the operation of a brake of a drive system comprising a motor operable to drive a pair of drive shaft arrangements for rotation, an inboard brake associated with the motor, a first outboard brake associated with an end part of a first one of the drive shaft arrangements, and first and second outboard position sensors associated with the end parts of respective ones of the drive shaft arrangements, the method comprising the steps of applying the first outboard brake, operating the motor to apply a torque to the first drive shaft arrangement, applying the inboard brake, de-activating the motor, and using the output of the second outboard position sensor in determining an operating status of the inboard brake and/or first outboard brake.

10 Claims, 1 Drawing Sheet

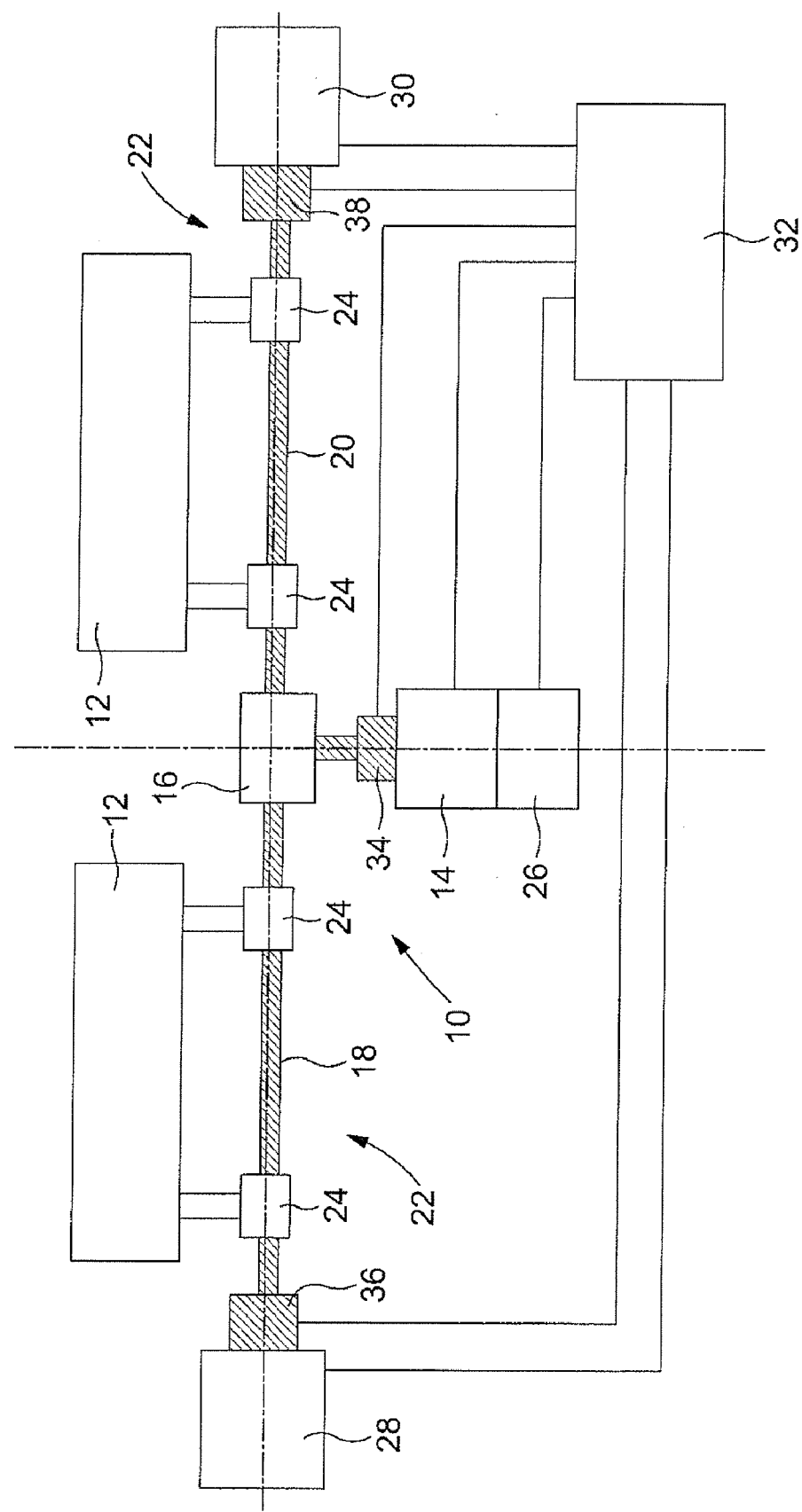

BRAKE TEST ARRANGEMENT

This invention relates to a method and apparatus for use in testing the operation of brakes, and in particular for use in testing the operation of the brakes associated with an aircraft flight control surface drive system, for example a system used to drive the flaps or slats associated with aircraft wings.

One form of known flight control surface drive system for use in aerospace applications includes a motor operable to drive a pair of drive shaft arrangements for rotation. Each drive shaft arrangement, which may be made up of a series of interconnected drive shaft segments, is arranged to transmit the motor drive to a series of actuators to cause movement of the flight control surfaces associated with the actuators. The actuators could comprise, for example, screw jack actuators or geared rotary hinge type actuators but it will be appreciated that the invention is not restricted in this regard. A position sensor monitors the position of the motor output and thereby provides an indication of the position of the flight control surfaces. The sensor may comprise an RVDT or an LVDT driven via appropriate gearing, for example as described in U.S. Pat. No. 5,097,933.

The motor has a brake associated therewith to allow the drive shaft arrangements to be held against rotation when the motor is not operating, and a position sensor is provided to allow the rotary position of the motor to be used to provide an indication of the positions of the flight control surfaces. The outboard end of each drive shaft arrangement is also provided with a brake to assist in holding the flight control surfaces against movement and so that the flight control surfaces can be held against movement in the event of, for example, failure of the brake associated with the motor or a failure of the drive shaft arrangement. The brakes are typically in the form of power-off friction brakes, although power-on brakes may be used where appropriate. There is a need to regularly test the functionality of the various brakes to ensure that they are able to withstand the loads to which they are subject, in use.

An outboard position sensor is typically provided adjacent to or associated with each wing tip brake and operable to monitor the rotary position of the associated drive shaft arrangement. By comparing the outputs of the outboard positions sensors, the occurrence of an asymmetry between the flight control surfaces to one side of the fuselage and those to the other side of the fuselage can be detected. Upon detection of such asymmetry, the system can be shut down and the brakes applied to prevent further movement of the flight control surfaces.

The sensors are typically driven via associated gear arrangements so that the sensors are driven through a single rotation as the flight control surfaces move from their stowed positions to their fully deployed positions. The analogue output of each sensor is converted to digital form to permit its use by an associated digital control unit. Electrical noise constraints typically limit the digital conversion to a 12 bit output.

The drive shaft arrangements will typically rotate through approximately 300 revolutions as the associated flight control surfaces are deployed, and as mentioned above the sensor rotates through a single revolution during this movement. The combination of this with the subsequent conversion of the sensor output to a digital signal results in the signal received by the control unit being only of relatively low resolution.

One technique that can be used to test the operation of the brakes of such an arrangement is to start driving the flight control surfaces from their fully deployed positions towards their retracted positions. One of the wing tip brakes can then be applied whilst the motor attempts to continue driving the flight control surfaces in the retract direction. By monitoring the output of the sensor associated with the applied wing tip brake an indication of the operating status of that brake can be achieved. Where the system is simply being used to confirm that the brake is operable and capable of locking the drive shaft against movement, the low resolution of the sensor is not problematic.

With the outboard brake applied, continued operation of the motor will result in limited twisting or winding up of the drive shaft arrangement. Once such winding has occurred, by applying the brake associated with the motor, de-activating the motor, and monitoring the output of the position sensor adjacent the motor it can be sensed whether the brakes are able to withstand the torque arising from the drive shaft arrangement being slightly wound in this manner. The operating status of the brake associated with the motor can thus also be determined.

The limited resolution of the position sensor outputs supplied to the control unit, in combination with the limited amount by which the drive shaft arrangement becomes wound or twisted during testing, results in accurate testing being difficult to achieve, particularly on smaller aircraft where the shorter drive shaft arrangements result in the system stiffness being higher and so less twisting or winding up is possible.

It is an object of the invention to provide a method and apparatus whereby testing of brakes in such applications can be achieved in a simple and convenient manner.

According to one aspect of the invention there is provided a brake test method for use in testing the operation of a brake of a drive system comprising a motor operable to drive a pair of drive shaft arrangements for rotation, an inboard brake associated with the motor, a first outboard brake associated with an end part of a first one of the drive shaft arrangements, and first and second outboard position sensors associated with the end parts of respective ones of the drive shaft arrangements, the method comprising the steps of:

applying the first outboard brake;
operating the motor to apply a torque to the first drive shaft arrangement;
applying the inboard brake;
de-activating the motor; and
using the output of the second outboard position sensor in determining an operating status of the inboard brake and/or the first outboard brake.

Preferably, the operating status of the inboard brake and/or the first outboard brake is determined by comparing the outputs of the first and second outboard position sensors. In such an arrangement a decrease, greater than a predetermined level, in a difference between the outputs of the first and second outboard position sensors may be used to indicate that the inboard brake and/or the first outboard brake is slipping. Conveniently, the outputs of the first and second outboard position sensors are compared whilst the motor is operating and none of the brakes are applied in order to permit calibration by determination of an initial offset between the sensor outputs.

Conveniently, the first and second outboard position sensors provide a relatively high output resolution. For example, the first and second outboard position sensors may undertake a plurality of revolutions, say five or more revolutions, as the drive system moves between its retracted and deployed positions. As such a sensor will provide the same output for several different positions, it cannot be used, alone, to indicate the absolute position of the drive system. An inboard, lower resolution position sensor is preferably also provided.

The method may include a further step of monitoring the speed of operation of the first outboard brake by monitoring the output of the first outboard position sensor. It may further include a step of monitoring the output of the first outboard position sensor whilst the motor is operating and the first outboard brake is applied, to provide an indication of the ability of the first outboard brake to lock the associated drive shaft arrangement against rotation.

The invention further relates to a brake test apparatus for use in testing the operation of a brake of a drive system comprising a motor operable to drive a pair of drive shaft arrangements for rotation, an inboard brake associated with the motor, a first outboard brake associated with an end part of a first one of the drive shaft arrangements, the brake test apparatus comprising first and second outboard position sensors, and means for determining, using the output of the second outboard position sensor, an operating status of the inboard brake and/or the first outboard brake of the associated drive system.

The first and second outboard position sensors are conveniently of relatively high output resolution, for example they may undertake several revolutions as the associated drive system moves between retracted and fully deployed positions.

According to another aspect of the invention there is provided a position sensing method for use with a drive system including a first, low resolution sensor and a second, higher resolution sensor, comprising the steps of:
using the output of the second sensor to identify a plurality of possible system positions; and
using the output of the first sensor to determine which one of the plurality of positions is the correct current system position.

The invention will further be described, by way of example, with reference to the accompanying drawing, FIG. 1, which is a diagrammatic view of a brake test apparatus in accordance with one embodiment of the invention.

Referring to FIG. 1 there is illustrated a drive system 10 for use in controlling the movement of a series of slats 12 or other flight control surfaces of an aircraft. Although, for simplicity, FIG. 1 illustrates only one slat 12 to each side of the aircraft fuselage, in practise there may be two or more such slats mounted for movement relative to respective wings of the aircraft.

The drive system 10 comprises a central drive motor 14, for example of electrically or hydraulically powered form, an output of which is connected to a gearbox 16 arranged to transmit rotary movement to first and second drive shaft arrangements 22. Each drive shaft arrangement 22 may be of multipart form but, for simplicity, in the arrangement shown comprises a single elongate drive shaft 18, 20. Each drive shaft 18, 20 is arranged to drive associated actuators 24 connected to the slats 12, and so it will be appreciated that the motor 14 is used to drive the slats 12 for movement between retracted and extended or deployed positions. The actuators 24 may take a range of forms. For example they could comprise screw jack actuators, or rotary geared hinge type actuators. However, it will be appreciated that the invention is not restricted in this regard.

A power off, inboard friction brake 26 is associated with the motor 14 and is operable to apply a braking force to the output of the motor, when deenergised, so as to resist rotation of the motor output, and hence movement of the slats 12, other than when desired. First and second outboard brakes 28, 30 are associated with respective ones of the drive shafts 18, 20. Like the inboard brake 26, the outboard brakes 28, 30 are operable to resist rotation of the drive shafts 18, 20 when slat movement is not required. Although the description herein makes reference to the use of power-off brakes, this need not always be the case and arrangements may be possible in which power-on brakes are used.

The operation of the motor 14 and the inboard and outboard brakes 26, 28, 30 are typically all controlled by a digital electronic control unit 32.

An inboard position sensor 34 is arranged to monitor the rotary position of the output of the motor 14, outputting this position information to the electronic control unit 32. The inboard position sensor 34 is arranged such that it rotates through approximately one revolution as the slats 12 are moved between their retracted and extended positions, and an appropriate step down gear arrangement is provided to achieve this. The output of the motor 14 may rotate through approximately 300 revolutions to achieve this movement of the slats 12. The output of the inboard position sensor 34, which is typically in an analogue form, is converted to digital form for use by the control unit 32. This conversion results in the output taking this form of, for example, a 12 bit word. The combination of the effect of the gearing and the analogue to digital conversion to a relatively short word results in the position information output to the control unit 32 from the inboard position sensor 34 being of relatively low resolution. Although, longer words could be used to enhance resolution, it is thought that noise will limit the degree to which resolution can be improved.

First and second outboard position sensors 36, 38 are arranged to monitor the rotary positions of the drive shafts 18, 20 adjacent respective ones of the outboard brakes 28, 30. The outboard positions sensors 36, 38 are of improved or enhanced resolution compared to the inboard position sensor 34, this being achieved by allowing each outboard position sensor 36, 38 to rotate through a plurality of revolutions as the slats 12 are moved between their retracted and extended positions. It will be appreciated that this may simply require the use of a different gear arrangement. As with the inboard position sensor 34, the outputs of the outboard position sensors 36, 38 are converted to digital form and are supplied to the control unit 32 for use thereby.

It will be appreciated that the enhanced degree of resolution of the outboard position sensors 36, 38 achieved as outlined above results in the sensors 36, 38 outputting the same position signal to the control unit 32 for several different slat positions. For example, if the outboard position sensors 36, 38 are arranged to undergo five revolutions as the slats 12 are moved between their retracted and extended positions, then the same sensor output will be supplied to the control unit 32 by each of the sensors 36, 38 five times during deployment, and a further five times during retraction of the slats 12. The outputs of the outboard position sensors 36, 38, alone, do not, therefore, provide an indication of the absolute positions of the slats 12.

Although the outputs of the outboard positions sensors 36, 38, alone, do not provide enough information to determine the absolute positions of the slats 12, the outputs of the outboard position sensors 36, 38 in combination with the output of the inboard position sensor 34 can be used by the control unit 32 to determine the slat positions with improved accuracy. The improved accuracy can be achieved as the output of the inboard position sensor 34 can be used to determine the approximate positions of the slats 12, providing sufficient information to allow the control unit to determine how many revolutions of the outboard position sensors 36, 38 have been undertaken. With this information, the outputs of the outboard position sensors 36, 38 of higher resolution can be used to determine the absolute slat position to a relatively high degree of accuracy.

As mentioned hereinbefore, there is a requirement to test the brakes 26, 28, 30 of the drive system to ensure that they are functioning correctly and are able to hold the slats 12 against movement, when required, and are able to withstand the aerodynamic loadings that are experienced by the slats 12, in use. In accordance with one embodiment of the invention, testing of the operating status of the brakes 26, 28, 30 whilst the aircraft is on the ground may be achieved using the method set out below.

Firstly, the motor 14 is operated to drive the slats 12 to their fully deployed or extended positions. Once this position has been reached, the motor 14 is driven in the opposite direction to commence retraction of the slats 12. Such movement removes any backlash from the system as the slats 12 will be being moved against the action of gravity. During this movement the motor 14 is driven slowly, more slowly than would be the case during normal deployment or retraction of the slats 12. After a few seconds, to allow the drive system to reach a steady operating state, the retracting movement of the slats 12 is monitored by periodically comparing the outputs of the outboard position sensors 36, 38 with one another. A running average of the most recent, say, 10 readings from each sensor is kept, and the difference between the average readings for the two outboard sensors 36, 38 is calculated to serve as an initial calibration offset therebetween. The averaging operation is advantageous in that it allows for compensation of noise generated errors.

After determination of the initial offset, one of the outboard brakes, for example the first outboard brake 28 is applied. The motor 14 continues to be driven, and so the drive system attempts to continue retracting the slats 12. The application of the first outboard brake 28 should result in the adjacent end of the first drive shaft 18 slowing and stopping, and the output of the first outboard position sensor 36 is monitored to sense whether and when this happens. For example, this may be achieved by monitoring the rate of decrease of the rotary speed of the first drive shaft 18, and the time taken for the shaft to stop rotating. Provided the speed decreases at an acceptable rate, it is known that the dynamic efficiency of the brake is acceptable. With the first outboard brake 28 engaged, the motor 14 continues to be driven and the output of the first outboard position sensor 36 is monitored to sense whether the end part of the first drive shaft 18 is rotating. Any such detected movement would indicate that the brake 28 is slipping. It is envisaged that such monitoring is undertaken by taking sensor readings from the first outboard sensor 36 every, say, 20 ms for a period of, say, 1200 ms. During this time, a change in the sensor output of more than, say, 2 bits may be taken to indicate that the brake is slipping.

It will be appreciated that, provided the first outboard brake 28 is operating correctly, then the continued operation of the motor 14 whilst the brake 28 is applied will result in the first drive shaft 18 becoming wound up or slightly twisted, and this can be used to further test the operation of the inboard and first outboard brakes 26, 28. This is achieved by applying the inboard brake 26 and subsequently deenergising the motor 14. Provided the inboard brake 26 and the first outboard brake 28 are both functioning correctly, the slightly wound or twisted state of the first drive shaft 18 resulting from the operation of the motor whilst the brake 28 is engaged and is thus locked in, the brakes 26, 28 resisting the torque applied thereto by the drive shaft 18 in trying to return to its relaxed unwound state. If the inboard brake 26 and/or the first outboard brake 28 is not operating correctly then the torque applied by the first drive shaft 18 will result either in the motor 14 output rotating, and thus in the second drive shaft 20 also rotating, and/or in the end of the first drive shaft 18 monitored by the first outboard sensor 36 rotating. As mentioned hereinbefore, the output of the inboard position sensor 34 is of relatively low resolution and may be incapable of sensing, accurately and conclusively, the small amount of amount of movement which may result from the unwinding of the first drive shaft 18 in the event of the inboard brake 26 not operating correctly.

Rather than use the output of the inboard position sensor 34 to determine whether or not the inboard brake 26 is operating correctly, in accordance with the invention the output of the second outboard position sensor 38 is used. The manner in which this is achieved conveniently comprises continuing to compare the outputs of the first and second outboard position sensors 36, 38 whilst the motor 14 is being driven to cause winding up of the first drive shaft 18. As the first drive shaft 18 becomes wound in this manner, it will be appreciated that the difference between the outputs of the first and second outboard position sensors 36, 38, adjusted to take into account the calculated initial offset, will increase, providing an indication of the amount of winding up of the first drive shaft 18 that has happened. Once the drive shaft 18 has become wound, for example to a level such that a 50 bit difference between the sensor outputs have been achieved, the inboard brake 26 is engaged and the motor 14 is deenergised as mentioned above, and the outputs of the first and second outboard position sensors 36, 38 continue to be monitored. Any decrease in the difference between the outputs indicates that the inboard brake 26 and/or the first outboard brake 28 is not functioning correctly, the outboard brake having already been tested as described above. It is envisaged that this monitoring step should continue for, say, 1.5 seconds and that during that time the adjusted difference between the outputs of the first and second outboard position sensors 36, 38 should remain at above approximately 50 bits. If it drops below this value, the control unit 32 will flag that there is a fault.

Once this procedure has been completed, it can be repeated, at least in part, to check that the second outboard brake 30 is operating correctly.

It will be appreciated that the arrangement described hereinbefore allows brake testing to be undertaken in a simple, convenient and reliable manner. As no significant additional components are required, the apparatus differing from known systems simply by the replacement of single turn position sensors with multi-turn position sensors and associated gear arrangements, it will be appreciated that the apparatus carries little, if any, weight penalty.

A wide range of modifications and alterations may be made to the arrangements described hereinbefore without departing from the scope of the invention.

The invention claimed is:

1. A brake test method for use in testing the operation of a brake of a drive system comprising a motor operable to drive a pair of drive shaft arrangements for rotation, an inboard brake associated with the motor, a first outboard brake associated with an end part of a first one of the drive shaft arrangements, and first and second outboard position sensors associated with the end parts of respective ones of the drive shaft arrangements, the method comprising the steps of:
   applying the first outboard brake;
   operating the motor to apply a torque to the first drive shaft arrangement;
   applying the inboard brake;
   de-activating the motor; and
   using the output of the second outboard position sensor in determining an operating status of the inboard brake and/or the first outboard brake.

2. A method according to claim 1, wherein the operating status of the inboard brake and/or the first outboard brake is determined by comparing the outputs of the first and second outboard position sensors.

3. A method according to claim 2, wherein a decrease, greater than a predetermined level, in a difference between the outputs of the first and second outboard position sensors is used to indicate that the inboard brake and/or the first outboard brake is slipping.

4. A method according to claim 1, wherein the outputs of the first and second outboard position sensors are compared whilst the motor is operating and none of the brakes are applied in order to permit calibration by determination of an initial offset between the sensor outputs.

5. A method according to claim 1, wherein the first and second outboard position sensors provide a relatively high output resolution.

6. A method according to claim 5, wherein the first and second outboard position sensors undertake a plurality of revolutions as the drive system moves between its retracted and deployed positions.

7. A method according to claim 5, further comprising an inboard, lower resolution position sensor.

8. A method according to claim 7, further comprising the steps of using the output of the first outboard position sensor to identify a plurality of possible positions of the first drive shaft arrangement, and using the output of the inboard position sensor to determine which one of the plurality of positions is the correct current position.

9. A method according to claim 1, further comprising a step of monitoring the speed of operation of the first outboard brake by monitoring the output of the first outboard position sensor.

10. A method according to claim 1, further comprising a step of monitoring the output of the first outboard position sensor whilst the motor is operating and the first outboard brake is applied, to provide an indication of the ability of the first outboard brake to lock the first drive shaft arrangement against rotation.

* * * * *